United States Patent [19]

Griffin et al.

[11] Patent Number: 4,938,613
[45] Date of Patent: Jul. 3, 1990

[54] MOLDABLE PLASTIC BEARING BALL RETAINER

[75] Inventors: Patrick M. Griffin, Pontiac, Mich.; Frederick E. Lederman, Sandusky, Ohio

[73] Assignee: General Motors Corporation, Detroit, Mich.

[21] Appl. No.: 383,682

[22] Filed: Jul. 24, 1989

[51] Int. Cl.⁵ .............................................. F16C 33/38
[52] U.S. Cl. ..................................... 384/526; 384/527; 384/531
[58] Field of Search ............... 384/526, 531, 532, 534, 384/523, 527

[56] References Cited

U.S. PATENT DOCUMENTS

| | | | |
|---|---|---|---|
| 1,715,848 | 6/1929 | Linde | 384/531 |
| 3,917,036 | 11/1975 | Johnson et al. | 192/45 |
| 4,126,362 | 11/1978 | Hamblin et al. | 384/531 |
| 4,278,307 | 7/1981 | Olschewski et al. | 384/526 |
| 4,420,195 | 12/1983 | Christen . | |
| 4,702,627 | 10/1987 | Pollastro | 384/526 |

Primary Examiner—Lenard A. Footland
Attorney, Agent, or Firm—Patrick M. Griffin

[57] ABSTRACT

A plastic ball retainer with a by-pass moldable design includes ball pocket bases joined with connector bars that occupy less radial space than the radial thickness of the pocket bases, with V shaped bridge members spanning the gaps between the pockets that occupy only radial space not occupied by the connector bars.

2 Claims, 3 Drawing Sheets

MOLDABLE PLASTIC BEARING BALL RETAINER

This invention relates to bearing ball retainers in general, and specifically to such a retainer that provides a circumferentially complete guide to exclude bearing balls from the circumferential gap between retention arms, but which does not interfere with the flexing of the arms, and which is also by-pass moldable.

BACKGROUND OF THE INVENTION

Conrad type ball bearings are assembled by first loading a complement of balls between the pathways of a pair of non concentric races, then moving the races to a concentric relation, spacing the balls out evenly, and finally pushing a ball retainer down into the ball complement. Each ball is forced into a separate, flexible ball pocket. It has been the practice over the last few years to integrally mold the retainers from plastic. Each pocket is generally C shaped, with a pair of retention arms that partially wrap the ball, and which, therefore, represent an undercut relative to the axis of the retainer. Still, that undercut is shallow enough, and the arms flexible enough, to allow the mold elements that form the pockets to popoout freely when the mold halves are pulled apart. This allows the retainer to be by-pass molded, that is, to be molded by a single pair of mold halves that part along the axis of the retainer. Also, because of the nature of a Conrad bearing, the adjacent retention arms of adjacent pockets have a significant circumferential gap between them. In one sense, it is desirable not to block those circumferential gaps with any other part of the retainer structure, as that would interfere with the the free flexing of the retention arms as the balls enter the pockets. In another sense, it is desirable to block those circumferential gaps, so as to keep the balls from hanging up in the gaps when the retainer is pushed in place.

The conventional response to these competing concerns had been to mold the retainer with upstanding fingers or projections in the circumferential gaps, which occupy some of the gap. The fingers exclude balls from hanging up, but do not prevent the arms of the retention pockets from flexing, since do not touch the arms. The fingers also have no undercuts relative to the axis of the retainer so the retainer can be by-pass molded. A good example of such a structure may be seen in USPN 3,749,461 to Liss et al. A finger 26 projects up in the gap between each pair of adjacent retention arms 22. But, finger 26, since it touches neither arm 22, in effect divides one circumferential gap into two. There is still not a circumferentially complete path to smoothly guide balls out of the gaps and into the pockets. The retainer disclosed in USPN 4,420,195 to Christen, assigned to the present assignee, does provide a circumferentially complete guiding path to either pocket, and does so without jeopardizing pocket flexibility. This is achieve by providing a peaked roof, in effect, over each gap, which slopes down from a central peak to each adjacent pocket. But the retainer is molded with a radial hollow below the roof. Balls inevitably see one side or the other of the peak of the roof, and are thus guided down along a complete path to one pocket or the other. As the balls enter the pocket, the flexing of the arms closes up the hollow, and the two sides of the roof flex down about the peak. This design, however, cannot be by-pass molded, and mold slides would have to be provided to create the necessary hollows. This would inevitably be more expensive than by-pass molding.

SUMMARY OF THE INVENTION

The present invention provides all the advantages of the last described retainer, but in a design that can be successfully by-pass molded.

In the embodiment disclosed, a plurality of generally C shaped ball retention pockets is formed by a base and a pair of upstanding, curved retention arms. Each pair of arms is sized to hold a ball, and so has a predetermined axial height. Since the retainer will be fitted into an annular space between two races, each pocket base has a predetermined radial thickness. Rather than being integrally molded together in a continuous annular ring, as is conventional, the pockets are connected in an evenly spaced circular array by a plurality of connector bars. Each pair of adjacent pocket bases is joined by a respective connector bar, leaving a circumferential gap therebetween, each connector bar has an axial height that is less than the height of the retention arms, and so does not interfere with the free flexing of the retention arms. While each connector bar is stiff enough to keep the adjacent pockets rigidly spaced, it occupies less than the entire radial thickness of the pocket bases. In addition, in the embodiment disclosed, each connector bar is located radially centrally relative to pocket bases that it joins.

Above each connector bar, a pair of generally V shaped bridge members spans each gap between pairs of adjacent retention arms, sloping down from an apex hinge point. The bridge members provide a complete ball track that guides the balls down to either side. But since the bridge members are located axially well above the respective connector bar, the flexing of the arms is not jeopardized. Furthermore, each pair of bridge members occupy only radial space not occupied by the connector bar that they overlay, so the entire retainer can be by-pass molded. In addition, in the embodiment disclosed, the inner edges of each pair of bridge members is chamfered, so as to provide an even more stable ball guidance track.

It is, therefore, a general object of the invention to provide a ball retainer that gives complete ball guidance and free pocket flexure, but is by-pass moldable.

It is another object of the invention to provide such a retainer design by connecting the pocket bases with connector bars that occupy less radial space than the radial thickness of the pocket bases, and by spanning the circumferential gaps over the connector bars with V shaped bridge members that occupy only radial space not occupied by the connector bars, so that the whole retainer can be by-pass molded.

It is another object of the invention to place the connector bars radially midway between the surfaces of the pocket bases, and provide a pair of parallel bridge members overlaying each respective connector bar, so as to create a ball guidance track to the pockets.

DESCRIPTION OF THE PREFERRED EMBODIMENT

These and other objects and features of the invention will appear from the following written description, and from the drawings, in which.

Figure 1:
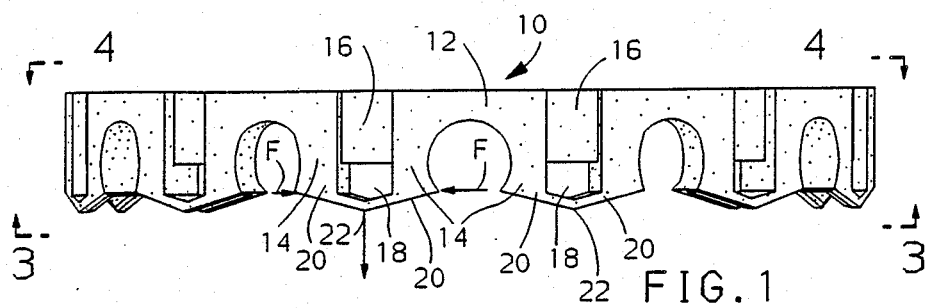
FIG. 1 is a side view of a preferred embodiment of the retainer of the invention.
Figure 2:
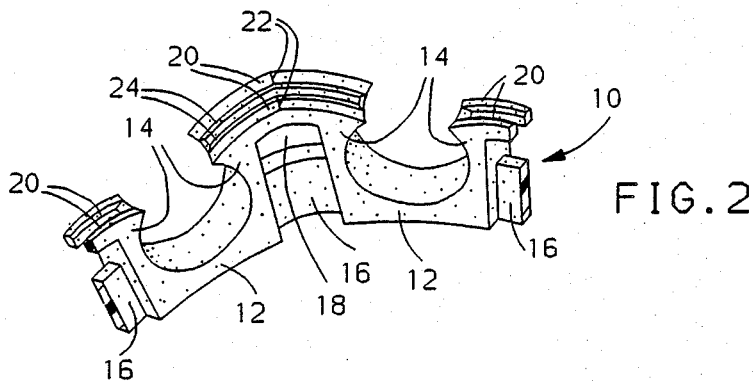
FIG. 2 is a perspective view of two adjacent pockets and the bridge members between them.
Figure 3:
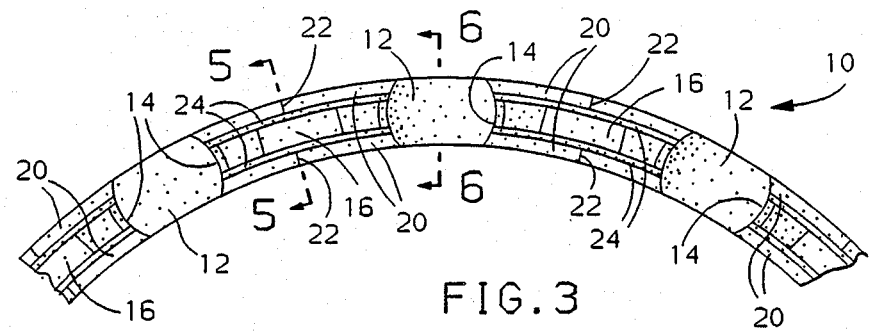
FIG. 3 is a plan view of a portion of the retainer from tne perspective of 3—3 in FIG. 1.
Figure 4:
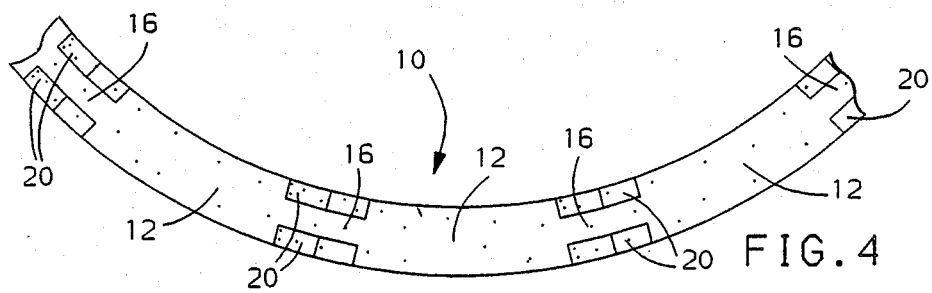
FIG. 4 is a plan view of a portion of the retainer from the perspective of 4—4 in FIG. 1.
Figure 5:
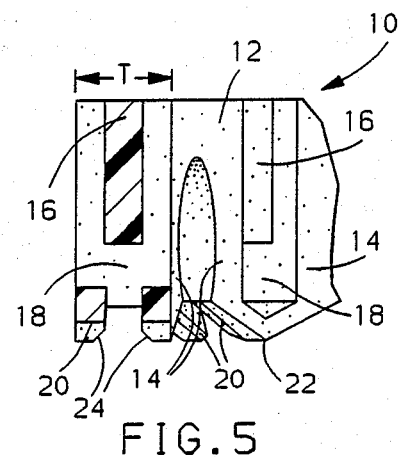
FIG. 5 shows a sectional view through the plane 5—5 of FIG. 3.
Figure 6:
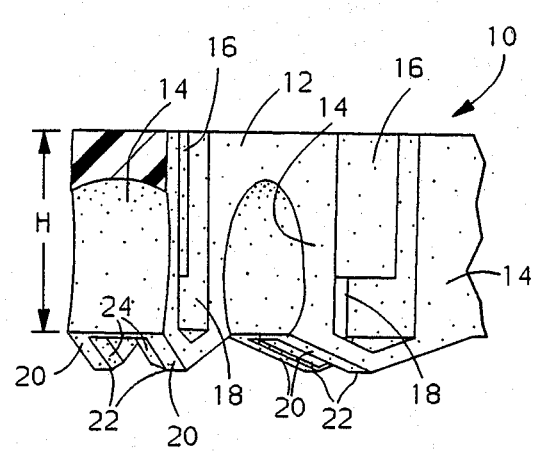
FIG. 6 shows a sectional view through the plane 6—6 of FIG. 3.

Referring first to FIGS. 1 through 6, a preferred embodiment of the ball retainer of the invention, indicated generally at 10, fits into the annular space between a pair of non illustrated bearing races. Retainer 10 includes an equal plurality of generally C shaped ball pockets, each of which is formed by a base 12 and a pair of curved, flexible retention arms 14 that extend axially up from each base 12. Each base 12 is arcuate, as best seen in FIG. 4. As best seen in FIG. 5, each base 12 has a predetermined thickness T that allows it to fit into the annular space without binding. Since each pair of retention arms 14 wraps just enough of a ball to hold it, they all have a predetermined axial height H, best seen in FIG. 6. The pockets so formed are maintained properly spaced in a circular array about a central axis. But the spacing between pockets is not maintained by integrally molding them into a constant thickness ring, as is conventional.

Still referring to FIGS. 1 through 6, each pocket base 12 is joined to an adjacent base 12 by a connector bar 16, creating a circumferential gap 18 between adjacent retention arms 14. As best seen in FIG. 4, each connector bar 16 is also arcuate, but its arc is much more shallow than the adjacent pocket bases 12, which are much longer. While each connector bar 16 is integrally molded to the pocket bases 12, it does not have the same radial thickness. Instead, as best seen in FIG. 5, it is only about half as thick, but is still stiff enough to maintain the gap 18. Each connector bar 16 is also located radially centrally relative to the pocket bases 12 to which it is molded, about midway between their radially inner and outer surfaces, for a reason described below. Each connector bar 16 is also significantly axially shorter than H. Thus, the gap 18 is not obstructed by the connector bars 16, so the ability of the adjacent retention arms 14 to flex is not jeopardized. The connector bars 16 cooperate with other structure, described next, to allow retainer 10 to be by-pass molded, as well as providing improved ball separation and guidance.

Referring next to FIGS. 1 through 5, each gap 18 is spanned by a pair of generally V shaped bridge members 20. Each pair of bridge members 20 slopes down to the upper end of an adjacent retention arm 14 from an apex 22 located axially above a respective connector bar 16. The bridge members 20 run generally parallel to one another, and occupy only radial space not occupied by the respective connector bar 16, as is best illustrated in FIG. 5. Therefore, the bridge members 20 are thin enough to be flexible about the apex 22. In addition, in the embodiment disclosed, each pair of bridge members 20 is chamfered at 24. As is also best illustrated in FIG. 5, the surfaces of connector bar 16 and the bridge members 20, in addition to not radially overlapping one another have no undercuts relative to the central axis of retainer 10. Thus, they can be by-pass molded. The elements of the first mold half that would move axially in to form the sides of the connector bar 16 would also form the undersurface of the bridge members 20, while the mold element of the second mold half that would move down between the pairs of bridge members 20 to form their inner surfaces would also form the top edge of the connector bar 16. The retention arms 14, since they wrap past the equator of a ball, do present an undercut relative to the central axis of retainer 10 However, since the gap 18 is unobstructed, and since the bridge members are thin enough to flex freely about 22, those elements of the mold on the second mold half that would form the inner surfaces of the retention arms 14 can be successfully axially withdrawn as the mold halves pull apart. That is, their withdrawal from between the arms 14 would create an outward force, as indicated at F in FIG. 1. As the adjacent retention arms 14 were flexed toward one another, closing up the gap 18, the bridge members 20 would fold about the apex 22, which would move axially out, as shown by the arrow in FIG. 1. Beyond being moldable, the design of retainer 10 described provides for an improved ball guidance, described next.

Figure 7:
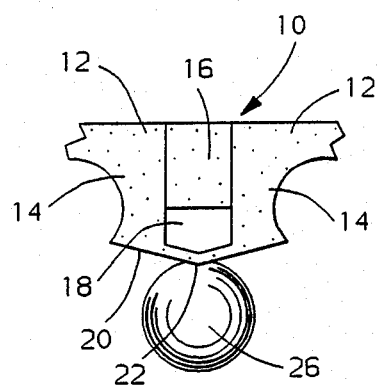
FIG. 7 is a side view of one pair of bridge members showing a ball at the apex.
Figure 8:
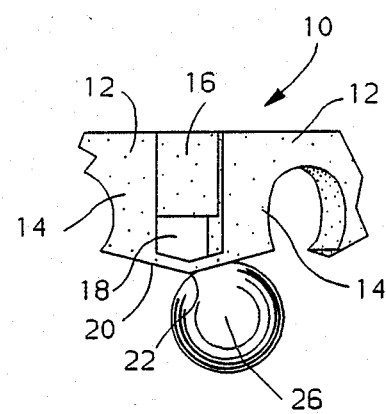
FIG. 8 is a view like 7, showing the ball rolling down the track.
Figure 9:
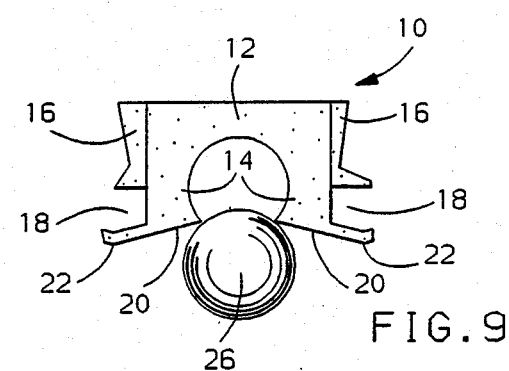
FIG. 9 is a view like 7, showing the ball centered over the pocket.

Referring next to FIGS. 7-10, the effect on one ball 26 is illustrated. It will be understood that there would be an entire complement of balls like 26, spaced out the same as the spacing of the ball pockets. The operation of pushing retainer 10 down into the ball complement is blind, and it is just as likely that each ball 26 will register with a gap 18 as it is that it will be perfectly centered between a pair of retention arms 14. The worst possible mismatch is illustrated in FIG. 7, with each ball 26 right at an apex 22. As retainer 10 is pushed axially in, it is also given a partial twist, in this case, counterclockwise. The grooves in retainer 10 created by the reduced thickness connector bars 16 provide convenient points for a tool to grab onto retainer 10 to apply the necessary twisting torque. The pairs of parallel bridge members 20 create a track down which the ball 26 can roll, toward an adjacent pocket. The track so provided is circumferentially complete from apex 22 to the end of the adjacent retention arm 14, and there is no place for ball 26 to hang up. Furthermore, the chamfered edges 24 make the track an even more stable one, as the ball 26 fits more deeply into the track. Eventually each ball 26 ends up as shown at FIG. 9, ready to pop in between a pair of retention arms 14. If the complement of balls 26 is held firmly between the races, this motion may actually be more in the nature of the retainer 10 being guided by the balls 26, rather than vice versa, though the net result is the same.

Variations of the preferred embodiment may be made. by-pass moldability could be achieved with a single bridge member, so long as it did not overlay the connector bar. Or, a single bridge member could centrally overlay a parallel pair of connector bars. However, the embodiment disclosed is preferred in that the parallel pair of thinner bridge members 20 that result from deliberately leaving an unobstructed mold path to connector bar 16 also provides greater flexibility at the apex 22, as well as the stable ball guiding ball track. Connector bar 16 could be made more or less high, depending on how much flexibility was desired for the retention arms 14, and made more or less thick, depending on how thick it was desired to make the bridge members 20. Therefore, it will be understood that it is not intended to limit the invention to just the embodiment disclosed.

The embodiments of the invention in which an exclusive property or privilege is claimed are defined as follows:

1. A moldable plastic bearing ball retainer, comprising, a plurality of generally C shaped ball retention pockets, each of said pockets having a base with a predetermined radial thickness and a pair of flexible ball retention arms extending axially up from said base with a predetermined axial height, a plurality of connector bars joining said pocket bases together in a circumferentially spaced array about an axis, each connector bar being sufficiently stiff to prevent said pocket bases from moving circumferentially relative to one another as a ball is forced between said retention arms, but having an axial height sufficiently less than said retention arms so as to leave a sufficient circumferential gap between adjacent retention arms of adjacent pockets so as to allow said adjacent retention arms to flex freely relative to one another as a complement of balls is forced into said retention pockets, each said connector bars further having a radial thickness less than said pocket base thickness, and, a generally V shaped bridge member spanning each circumferential gap between said adjacent retention arms, each bridge member sloping down to said adjacent retention arms from an apex hinge point located axially above a respective connector bar, thereby guiding said bearing balls to said pockets while allowing said retention arms to flex freely, each bridge member further occupying only radial space unoccupied by said respective connector bar, whereby said retainer may be integrally molded by a single pair of mold halves that part along said axis.

2. A moldable plastic bearing ball retainer, comprising, a plurality of generally C shaped ball retention pockets, each of said pockets having a base with a predetermined radial thickness and a pair of flexible ball retention arms extending axially up from said base with a predetermined axial height, a plurality of connector bars joining said pocket bases together in a circumferentially spaced array about an axis, each connector bar being sufficiently stiff to prevent said pocket bases from moving circumferentially relative to one another as a ball is forced between said retention arms, but having an axial height sufficiently less than said retention arms so as to leave a sufficient circumferential gap between adjacent retention arms of adjacent pockets so as to allow said adjacent retention arms to flex freely relative to one another as a complement of balls is forced into said retention pockets, each connector bars further having a radial thickness less than said pocket base thickness and being located radially midway relative to said pocket base, and, a pair of generally V shaped bridge members spanning each circumferential gap between said adjacent retention arms, each pair of bridge members sloping down to said adjacent retention arms from an apex hinge point located axially above a respective connector bar, thereby guiding said bearing balls to said pockets while allowing said retention arms to flex freely, each pair of bridge members further occupying only radial space unoccupied by said respective connector bar, whereby said retainer may be integrally molded by a single pair of mold halves that part along said axis.

* * * * *